United States Patent [19]

Weidl et al.

[11] 4,271,869
[45] Jun. 9, 1981

[54] HYDROPNEUMATIC PRESSURE RESERVOIR ASSEMBLY

[75] Inventors: Johann Weidl, Heidenfeld; Günter Heyer; Wilhelm Wecker, both of Schweinfurt; Gerhard Weippert, Bad Kissingen; Paul Spichala, Schweinfurt, all of Fed. Rep. of Germany

[73] Assignee: Fichtel & Sachs AG, Schweinfurt, Fed. Rep. of Germany

[21] Appl. No.: 37,126

[22] Filed: May 8, 1979

[30] Foreign Application Priority Data

May 17, 1978 [DE] Fed. Rep. of Germany ....... 2821492

[51] Int. Cl.³ ............................................. F16L 55/04
[52] U.S. Cl. ..................................... 138/30; 188/269;
   188/298; 188/314; 220/85 B; 267/122
[58] Field of Search ...................... 188/298, 314, 269;
   267/64 R, 64 B, 118, 122; 280/208, 209, 210;
   222/95; 220/85 B, 461; 138/30

[56] References Cited

U.S. PATENT DOCUMENTS

| 2,094,457 | 9/1937 | Lattner | 138/30 X |
| 2,278,688 | 4/1942 | Caminez | 138/30 |
| 2,543,585 | 2/1951 | Miller | 138/30 |
| 2,620,182 | 12/1952 | Marston et al. | 267/64 R |
| 3,158,296 | 11/1964 | Cornelius | 220/85 B |
| 3,232,599 | 2/1966 | Faisandier | 267/64 B |

FOREIGN PATENT DOCUMENTS

| 842835 | 3/1939 | France | 138/30 |
| 1113867 | 12/1955 | France | 188/314 |
| 475417 | 11/1937 | United Kingdom | 267/64 R |
| 942352 | 11/1963 | United Kingdom | 267/64 R |

Primary Examiner—George E. A. Halvosa
Attorney, Agent, or Firm—Toren, McGeady and Stanger

[57] ABSTRACT

A hydropneumatic assembly particularly for use as a pressure reservoir in a shock absorber includes a housing with a diaphragm operatively mounted within the housing to define therein a liquid chamber on one side of the diaphragm and a gas chamber on the opposite side thereof. The liquid chamber is defined between an inner wall of the housing and the diaphragm and the diaphragm is arranged to be pressed against the inner wall under the influence of gas pressure within the gas chamber. Damping liquid for a shock absorber flows into and out of the liquid chamber to an opening provided in the inner wall of the housing and, by a special feature of the assembly, ducts are defined between the inner wall of the housing and the diaphragm, with the ducts being directed to extend toward the opening through which liquid flows into and out of the liquid chamber.

7 Claims, 9 Drawing Figures

HYDROPNEUMATIC PRESSURE RESERVOIR ASSEMBLY

BACKGROUND OF THE INVENTION

The present invention relates generally to hydropneumatic devices and more particularly to a pressure reservoir or accumulator which is particularly adapted for use with the shock absorber of a vehicle. The invention is particularly concerned with the type of pressure reservoir wherein a housing has a diaphragm located therein to separate the housing into a gas chamber and a liquid chamber, which liquid chamber is in communication with a shock absorber. The diaphragm is normally pressed against the inner wall of the housing by compressed gas on a side of the diaphragm opposite the liquid chamber and the liquid enters and leaves the liquid chamber through an opening in the housing wall.

In the utilization of hydropneumatic pressure reservoirs of the type described, particularly in connection with shock absorbers which are mounted in a vehicle, there will normally arise the requirement that the outer diameter of the apparatus be as small as possible for a given nominal volume. In known devices, the general construction has usually involved a spherical configuration and pressure reservoirs of the prior art are normally equipped with diaphragms which are adjusted to this spherical shape. Pressure reservoirs of this type may have a relatively large outer diameter and they therefore may not be suitable for use in connection with shock absorbers used in certain applications, particularly those used in connection with motorcycles.

In order to take into account the conditions of a given installation and the required shape of the pressure reservoirs, another known embodiment in the prior art involves a reservoir which is constructed as a cylindrical container wherein the axial structural length is large with relation to the diameter. As a result, it is not possible to achieve an ideal ratio of length to diameter which should be about 1:1 for the reservoir in respect to the design of the diaphragm. Furthermore, in order to enable realization of a large nominal volume, it is necessary to maintain the distances between the diaphragm and the inner wall of the reservoir relatively small. The shape of known reservoirs has the disadvantage that between the diaphragm and the inner wall of the housing or liquid container, bubbles may be formed when the liquid is to be emitted from the reservoir. As a rule, repeated introduction and emission of the liquid from the liquid container is involved and thus the liquid cannot flow off into the working chamber of the shock absorber as a result of the bubbles which may be accumulated. This may lead to a liquid deficit in the adjacent working chamber so that the diaphragm may expand more than is desirable in the direction of the outlet opening leading from the liquid chamber to a working chamber of the shock absorber. This expansion may occur to such an extend that the diaphragm may be forced into the inlet/outlet opening of the liquid chamber and may therefore become damaged as a result.

The present invention is directed toward avoiding disadvantages of known constructions and toward provision of a hydropneumatic pressure reservoir which will facilitate functioning of the apparatus in all states of operation. The invention aims toward provision of a structure wherein the load on the diaphragm is lowered and wherein there is prevented formation of liquid pockets between the reservoir housing and the diaphragm.

SUMMARY OF THE INVENTION

Briefly, the present invention may be described as a hydropneumatic assembly, particularly suited for use with a shock absorber of a motor vehicle, comprising a liquid-tight housing, with a diaphragm being operatively mounted within said housing to define therein a liquid chamber on one side of said diaphragm and a gas chamber on the opposite side of said diaphragm. The liquid chamber is defined between an inner wall of the housing and the diaphragm, and the diaphragm is arranged to be pressed against the inner wall of the housing under the influence of gas pressure within the gas chamber. The assembly includes opening means permitting flow of liquid into and out of the liquid chamber and means defining ducts between said inner wall of said housing and said diaphragm, said ducts being directed to extend in a direction toward said opening means.

In accordance with the present invention, the duct means may be provided between the inner wall of the reservoir housing and the outer wall of the diaphragm in any one of several different structural approaches. The ducts will have the primary purpose of preventing liquid bubbles from forming between the diaphragm and the inner walls of the reservoir housing. As a result, excellent functioning of the pressure reservoir will be insured and expansion of the diaphragm and, thus, overloading of the diaphragm will be avoided.

In one aspect of the invention, the duct means may be defined either by ribs or, alternatively, by grooves which may be arranged on the inner wall of the reservoir housing and which may extend in the longitudinal direction thereof.

Alternatively, the ducts may be defined by corrugations which may be formed directly on the outer wall of the membrane or diaphragm itself, with the corrugations being arranged to extend essentially in the longitudinal direction of the assembly.

In accordance with a further feature of the invention whereby the duct means may likewise be defined, a spacer body provided with openings or through holes may be arranged between the diaphragm and the inner wall of the reservoir housing. This spacer body need not rest completely against the inner wall of the reservoir housing so that when liquid is removed from the housing, the liquid emerging through the through holes in the spacer body may flow off between the spacer body in the inner wall of the reservoir housing.

In accordance with a further feature of the invention, which provides an especially simple construction arrangement, there may be located between the reservoir and the inner wall of the diaphragm housing a component which may be formed as a basket member with a frame-like configuration, the component having distributed over its circumference a plurality of arms which extend essentially in the axial direction, with this component having a bottom constructed as a stop means for the diaphragm movement in the axial direction. In accordance with the invention, the design of this basket member may be relatively simple since the arms thereof may be constructed so as to freely extend in an unsupported manner from the bottom of the basket-like member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENT

Figure 1:
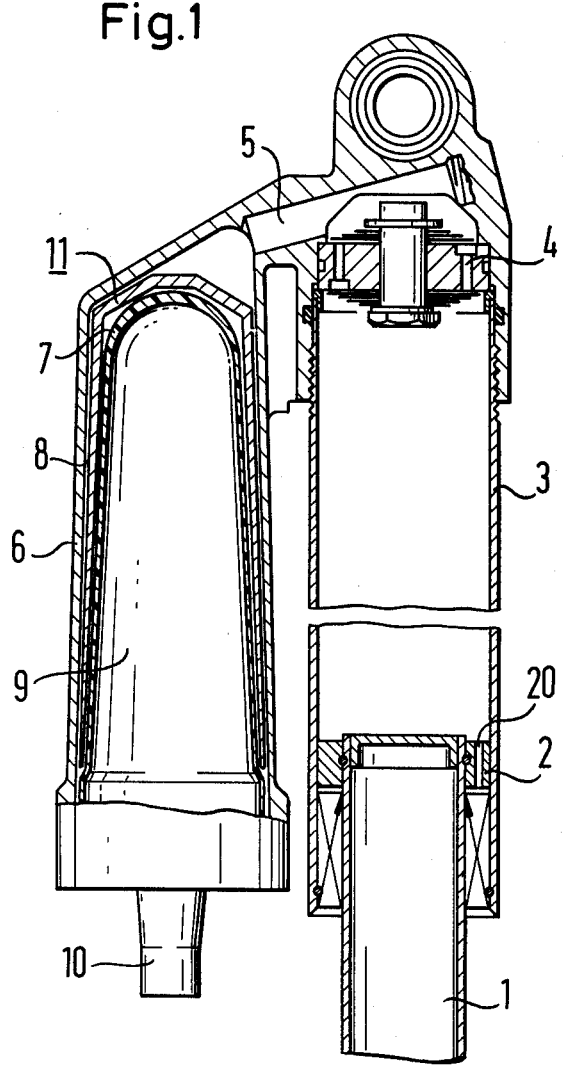
FIG. 1 is a longitudinal sectional view of an overall shock absorber assembly including a pressure or hydropneumatic reservoir in accordance with the present invention.

Referring now to FIG. 1 there is shown a shock absorber assembly which may be primarily useful in the suspension system of the rear wheels of motorcycles. The shock absorber assembly shown in FIG. 1 consists of a piston rod 1 which is rigidly connected to a piston 2. The piston 2 is arranged to slide in a cylinder 3 when the piston rod 1 is moved inwardly and outwardly as a result of the spring-suspended motion of a rear wheel (not shown) of the vehicle upon which the shock absorber may be operatively mounted. Damping liquid is thereby delivered from the cylinder 3 through a damping valve arrangement 4 and through a duct 5 into the interior of a reservoir housing 6.

The reservoir housing 6 forms a part of a hydropneumatic pressure assembly formed in accordance with the present invention wherein a diaphragm 7 is stretched within the inner wall of the reservoir housing 6 to define therein a gas chamber and a liquid chamber on opposite sides of the diaphragm 7.

As a further element of the overall assembly of the invention, a basket-like frame member 11 is arranged between the diaphragm 7 and the inner wall of the reservoir housing 6. The basket or frame member 11 is formed in accordance with the structure shown in FIG. 8 and it will be noted that as a result of the structure of the basket member 11 ducts 8 will be formed to extend in the axial direction of the housing 6 in order to effect the discharge of the damping liquid from within the reservoir housing 6 through the ducts 5 and through the damping valve arrangement 4 when the piston rod 1 is moved outwardly from the cylinder 3.

The spring or shock absorbing action of the assembly is effected by gas pressure prevailing in a gas chamber 9 formed on one side of the reservoir 7. The chamber 9 may be filled with gas through a gas valve 10. The ducts 8 extending in the axial direction will always provide a result wherein the damping liquid located between the reservoir 6 and the diaphragm 7 will flow off in a manner whereby no liquid bubbles will be formed between the reservoir housing 6 and the diaphragm 7.

Figure 2:
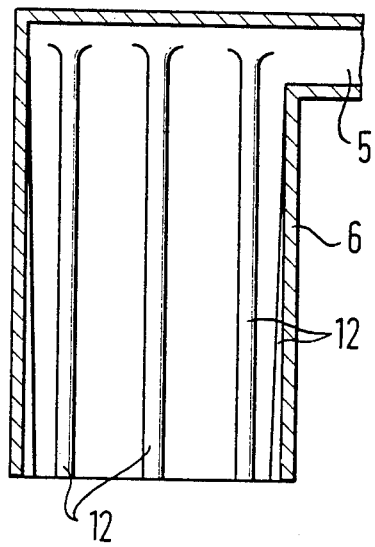
FIG. 2 is a longitudinal sectional view showing a section of the reservoir housing of the assembly shown in FIG. 1 wherein ribs are provided on the inner surface of the housing.
Figure 3:
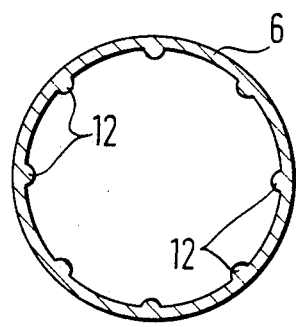
FIG. 3 is a cross sectional view of the housing shown in FIG. 2.

Shown in FIGS. 2 and 3 is a further embodiment of the invention wherein the reservoir housing 6 may be provided with ribs 12 which extend in the longitudinal direction thereof. The ribs 12 will operate to create ducts which will extend in the axial direction of flow of the liquid and which are directed toward the duct or opening means 5 and which will thus insure trouble-free discharge of damping liquid from within the reservoir housing 6.

Figure 4:
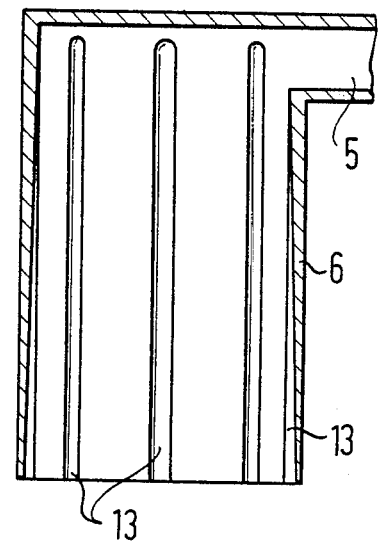
FIG. 4 is a longitudinal sectional view of another embodiment of the reservoir housing which is provided with grooves.
Figure 5:
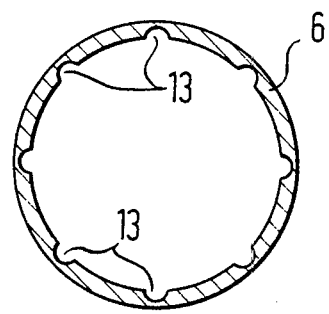
FIG. 5 is a cross sectional view of the reservoir housing shown in FIG. 4.

A further embodiment of the invention is shown in FIGS. 4 and 5. In this embodiment, instead of the ribs or convexities 12 shown in FIGS. 2 and 3, a plurality of grooves or concavities 13 are provided on the inner wall of the reservoir housing 6 which are also formed to extend in the axial direction of the reservoir housing and which are arranged to extend in a direction toward the duct 5.

It will be seen that both the ribs 12 and the grooves 13 will operate to define duct means extending in the direction of the opening or duct 5 of the housing 6.

Figure 6:
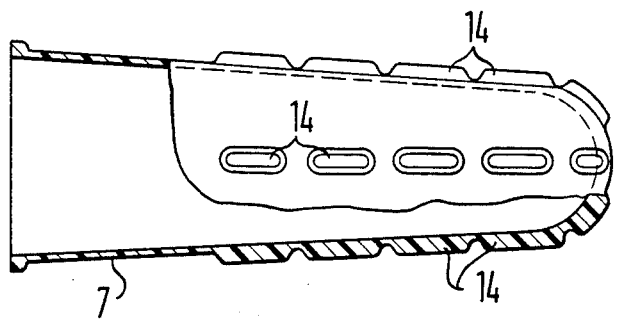
FIG. 6 is a partial sectional view, partially broken away of a diaphragm formed in accordance with a further embodiment of the invention.

In FIG. 6 there is shown a further embodiment of the invention whereby the duct means of the invention may be defined by corrugations 14 which are formed on the outer surface of a diaphragm 7 and which will essentially extend in the longitudinal direction of the assembly and thus form discharge duct means for the hydraulic liquid, in a manner similar to that previously described.

Figure 7:
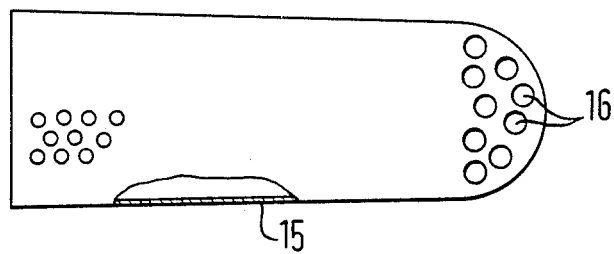
FIG. 7 is a side view partially broken away of a spacer body provided in accordance with a further embodiment of the invention.

A still further embodiment of the invention may be formed in accordance with FIG. 7 wherein there is depicted a spacer body 15 which is arranged between the diaphragm and the reservoir housing inner wall, with the spacer body 15 being provided with through holes or openings 16 extending therethrough. This spacer body will define duct means toward the inner wall of the reservoir housing thereby allowing liquid emerging from the through holes to flow off.

Figure 8:
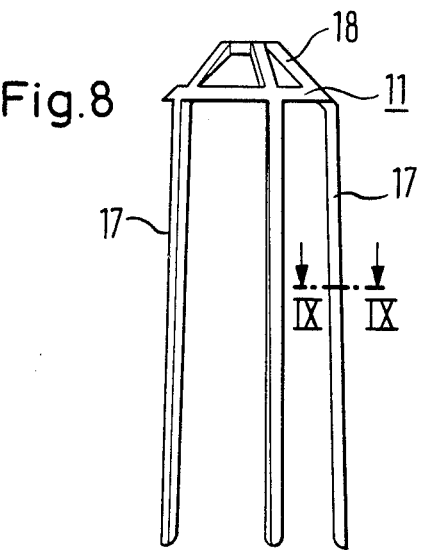
FIG. 8 is a side view showing a further embodiment of the invention wherein a spacer body constructed in a basket-like arrangement is depicted.
Figure 9:
FIG. 9 is a sectional view taken along the line IX—IX of FIG. 8.

The basket 11 illustrated in FIG. 1 is shown in greater detail in FIGS. 8 and 9. It will be seen that the basket 11 is essentially a separate component which consists of arms 17 extending in the axial direction with the basket having means defining a basket bottom 18. As FIG. 1 shows, the diaphragm 7 will be in the interior of the basket 11 with the arms 17 resting against the inner wall of the reservoir housing 6. The basket end or bottom 18 will have the additional advantage that damping liquid which is caused to flow out of the duct 5 when the piston rod 1 is moved inwardly very rapidly, will be deflected and thus will be rendered incapable of causing damage to the diaphragm 7. Additionally, the basket end or bottom 18 will operate as the stop member taken in the axial direction for the diaphragm 7 thereby preventing the diaphragm from being drawn or pulled toward the mouth of the opening means or duct 5 when liquid flows out of the reservoir 6 very rapidly with high velocity.

In FIG. 9 there is shown on an enlarged scale a sectional view taken through an arm 17 of the basket 11 showing that the arm 17 is rounded off on the side thereof facing toward the diaphragm 7.

The spacer body 15 formed in accordance with FIG. 7 and the basket 11 formed in accordance with FIG. 8 may be placed freely within the reservoir housing 6. However, they may also be attached to the housing 6 or the diaphragm 7. In the case of the spacer body 15 of FIG. 7, it may be required that the diameter of the spacer body 15 be formed at any point along its length to be smaller than the corresponding diameter of the inner wall of the housing 6 in order to insure free inflow and outflow of liquid from within the diaphragm housing 6. However, in the case of the basket 11 of FIG. 8, the arms 17 may rest against the inner wall of the housing 6 and they may even be pressed together radially inwardly when the basket 11 is being inserted into the housing 6 so that they will rest against the inner wall of the housing with a slight spring tension.

With respect to FIG. 1 it should be added that the piston member 2 has a damping bore 20 so that, when the piston 1 is moved inwardly of the cylinder 3, the displacement volume will be determined by the cross section of the piston rod 1.

While specific embodiments of the invention have been shown and described in detail to illustrate the application of the inventive principles, it will be understood that the invention may be embodied otherwise without departing from such principles.

What is claimed is:

1. A hydropneumatic assembly comprising: a housing having a generally longitudinal configuration and defining an axis; a diaphragm operatively mounted within said housing and defining therein a liquid chamber on one side of said diaphragm and a gas chamber on the opposite side thereof; said liquid chamber being defined between an inner wall of said housing and said diaphragm, with said diaphragm being arranged to be urged toward said inner wall under the influence of gas pressure within said gas chamber; opening means disposed within said liquid chamber at an axial end of said longitudinal housing for permitting flow of liquid into and out of said liquid chamber; and a frame member constructed with a basket-like configuration interposed between said diaphragm and said housing inner wall within said liquid chamber and extending generally over the entire longitudinal length of the housing, said frame member being formed with a plurality of generally elongate arms distributed circumferentially about said diaphragm and extending essentially in the axial direction of said housing; said arms being spaced apart to define longitudinally extending ducts therebetween, each of said ducts being arranged to extend generally over the entire axial length of said frame member toward said opening means contiguously with the inner wall of said housing and opening throughout their length to both sides of the frame member.

2. An assembly according to claim 1 wherein said basket-like frame member is formed with components which are located to be in abutment against the inner wall of said housing.

3. An assembly according to claim 1 wherein said arms rest against the inner wall of said housing along at least a portion of their lengths.

4. An assembly according to claim 1 wherein said basket-like frame member is formed with an end region having said arms extending freely therefrom, said end region of said frame member being located adjacent said opening means in said assembly.

5. An assembly according to claim 1 wherein said housing comprises an inner wall which is essentially cylindrical in configuration.

6. An assembly according to claim 1 wherein said housing comprises an inner wall having a generally conical configuration and slightly tapered toward said opening means.

7. An assembly according to claims 5 or 6 wherein said diaphragm is formed in general conformity with the configuration of said housing inner wall, said diaphragm having an end facing toward said opening means which is constructed with a cup-shaped configuration.

* * * * *